(12) United States Patent
Humphrey

(10) Patent No.: US 9,025,744 B2
(45) Date of Patent: May 5, 2015

(54) SYSTEM FOR PROVIDING TELEPHONY AND DATA SERVICES

(75) Inventor: Leslie Derek Humphrey, London (GB)

(73) Assignee: British Telecommunications Public Limited Company, London (GB)

(*) Notice: Subject to any disclaimer, the term of this patent is extended or adjusted under 35 U.S.C. 154(b) by 130 days.

(21) Appl. No.: 13/821,923

(22) PCT Filed: Sep. 9, 2011

(86) PCT No.: PCT/GB2011/001334
§ 371 (c)(1),
(2), (4) Date: Mar. 8, 2013

(87) PCT Pub. No.: WO2012/032309
PCT Pub. Date: Mar. 15, 2012

(65) Prior Publication Data
US 2013/0163732 A1 Jun. 27, 2013

(30) Foreign Application Priority Data
Sep. 10, 2010 (EP) .................................... 10251572

(51) Int. Cl.
*H04M 11/06* (2006.01)
*H04L 12/28* (2006.01)
(Continued)

(52) U.S. Cl.
CPC ............ *H04M 11/066* (2013.01); *H04M 11/06* (2013.01); *H04L 12/2898* (2013.01); *H04M 1/2535* (2013.01); *H04M 1/738* (2013.01)

(58) Field of Classification Search
CPC H04L 12/2898; H04M 1/738; H04M 11/066; H04M 11/06; H04M 1/2535

USPC .......... 379/93.07, 90.01, 93.05, 92.04, 93.06, 379/93.28
See application file for complete search history.

(56) References Cited

U.S. PATENT DOCUMENTS

| 4,103,112 A | 7/1978 | Korsky |
| 4,815,124 A | 3/1989 | Bowers |
| 5,473,676 A * | 12/1995 | Frick et al. ................. 379/93.09 |

(Continued)

FOREIGN PATENT DOCUMENTS

| EP | 0 600 644 A1 | 6/1997 |
| EP | 1 009 156 A2 | 6/2000 |

(Continued)

OTHER PUBLICATIONS

U.S. Appl. No. 13/988,941, filed May 22, 2013, Inventor: Leslie Derek Humphrey.

*Primary Examiner* — Melur Ramakrishnaiah
(74) *Attorney, Agent, or Firm* — Patterson Thuente Pedersen, P.A.

(57) ABSTRACT

A system to provide telephony and data services includes a termination unit having a connector portion to a corresponding termination unit to modem connector containing at least three conductors. The termination unit provides a good electrical connection between two conductors that carry data signals between the access network and a user modem, and insulates the other conductor or conductors from the incoming pair of conductors. A user modem connects to the termination unit to modem connector and is operable to transmit data signals onto and to receive data signals from the data carrying conductors as well as telephony signals onto and from a pair of modem-side telephony signal carrying conductors. A cross-connection unit has a connection portion that connects with a telephone connector.

7 Claims, 2 Drawing Sheets

(51) Int. Cl.
  *H04M 1/738* (2006.01)
  *H04M 1/253* (2006.01)

(56) References Cited

U.S. PATENT DOCUMENTS

| | | | |
|---|---|---|---|
| 5,848,150 | A | 12/1998 | Bingel |
| 6,269,154 | B1 | 7/2001 | Chellali |
| 6,522,730 | B1 | 2/2003 | Timm |
| 6,563,864 | B1 | 5/2003 | Ibrahim |
| 6,563,924 | B1 | 5/2003 | Cho |
| 6,671,373 | B1 | 12/2003 | Pang |
| 6,724,890 | B1 | 4/2004 | Barels |
| 6,813,343 | B1 | 11/2004 | Vitenberg |
| 7,317,793 | B2 | 1/2008 | Binder |
| 7,580,732 | B2 | 8/2009 | Bailey |
| 7,702,095 | B2 | 4/2010 | Binder |
| 8,107,618 | B2 | 1/2012 | Binder |
| 2003/0179818 | A1 * | 9/2003 | D'Angelo et al. ............ 375/222 |
| 2004/0151305 | A1 | 8/2004 | Binder et al. |
| 2004/0179662 | A1 | 9/2004 | Bremer |

FOREIGN PATENT DOCUMENTS

| | | |
|---|---|---|
| EP | 1 079 589 A2 | 2/2001 |
| FR | 2 896 935 A1 | 8/2007 |
| FR | 2896935 A1 * | 8/2007 |
| FR | 2 933 835 A1 | 1/2010 |
| GB | 2 445 212 A | 7/2008 |
| WO | WO 01/06751 A1 | 1/2001 |
| WO | WO 2005/043880 A1 | 5/2005 |
| WO | WO 2008/132428 A1 | 11/2008 |

* cited by examiner

SYSTEM FOR PROVIDING TELEPHONY AND DATA SERVICES

RELATED APPLICATIONS

The present application is a National Phase entry of PCT Application No. PCT/GB2011/0031334, filed Sep. 9, 2011, which claims priority from EP Patent Application No. 10251572.3, filed Sep. 10, 2010, the disclosures of which are hereby incorporated by reference herein in their entireties.

FIELD OF THE INVENTION

The present invention relates to a system for providing telephony and data services, especially within a customer premises (e.g. a domestic consumer home), and most particularly where the data service operates over a high speed Digital Subscriber Line (DSL) connection, such as, for example, a DSL connection operating in accordance with one of the Very high speed DSL (VDSL) standards.

BACKGROUND TO THE INVENTION

FR 2 896 935, dated 27 Jun. 2006, describes an approach for overcoming the problems of the so-called "bell-wire" when home extension telephone wiring which includes such a bell wire is used for carrying DSL signals. The bell wire is a third wire which is connected to the two incoming copper conductors (the "drop wire") via a filter in such a way that a ringing signal transmitted over the incoming "drop wire" will be passed onto the bell wire and will thus cause the bell of a suitably connected telephone to ring, while other signals (e.g. associated with pulse dialling performed by another telephone within the same home wiring system) will not be carried onto the bell wire. The bell wire is therefore used to overcome the problem of tinkling which sometimes otherwise occurred in conventional analog telephone systems. However, as noted in FR 2 896 935, this bell wire caused problems with DSL systems (when they were introduced) as the bell wire appears to a DSL modem as a bridged tap at DSL frequencies and also tended to pick up noise which also caused problems for the DSL signals. To mitigate these problems, FR 2 896 935 proposes connecting another pair of wires (which includes the bell wire as one of the pair of wires) with the signal carrying wires within the home extension wiring to provide an additional parallel pair of wires for carrying signals on over the home wiring. For example, in France, the drop wire conductors A and B are typically connected to the 1 and 3 wires within a 6-wire home extension wiring system and the 5 wire acts as the bell wire; with such a configuration, FR 2 896 935 proposes connecting wire 1 directly to wire 5 and wire 3 to wire 2. This effectively shortcuts the filter between the A wire and the bell wire. Additionally, at each point where a device connects to a home wiring extension socket a dongle is used which also connects together the 1 and 5 wires and the 2 and 3 wires. Thus all signals are now carried over two pairs of wires through the extension wiring with no filtering between any of them. This greatly improves performance in the presence of a functioning bell wire and does not hinder performance in cases where the bell wire had been disconnected (or never connected).

More recently, attention in the industry has turned towards high speed DSL systems such as VDSL systems which require the DSL connection (i.e. the part of the connection over copper cables) to be as short as possible in order to provide the fastest connections. It has therefore been proposed to place DSL modems, at the network side (network modems), at so called "drop points". Such drop points might typically, for example, be at the top of a telegraph pole from where a number of telephone lines fan out each heading towards a different house. Such a point is likely to be the final distribution point before the external cable reaches the customer's premises.

In such situations it can be difficult for the network modem at the distribution point to obtain a reliable power supply from its immediate vicinity. Solutions have therefore been devised by which power is supplied from the consumer's premises over the copper pair connection together with the DSL signals.

In such scenarios normal telephony is normally provided by a Voice Over Internet Protocol (VOIP) solution because otherwise the reverse power (e.g. as a 50 volt d.c. supply) would appear as a signal which would disrupt normal conventional analog telephony signals. Generally, to provide this VOIP solution, the DSL modem in the customer's premises is configured to provide a socket into which a conventional lead, having a conventional plug (e.g. a Registered Jack (RJ) 11 or 45 or a conventional BT plug, etc.) from a conventional telephone apparatus may be plugged. The modem simulates all of the Plain Old Telephone System (POTS) functionality (including various DC and other low frequency signals) generally provided by a conventional master socket which provides the interface between the customer's premises and the access network such that the telephone (for example an analog telephone) can operate normally as though it were directly connected to the master socket (e.g. a conventional British Telecommunications (BT) Network Termination Equipment (NTE) 5 model) or an extension socket correctly connected to the master socket.

However, when a telephone is connected directly to the user modem in this way, it becomes difficult for a user to use any existing extension telephone wiring (e.g. to extension sockets) for connecting additional telephones in locations which may be considerably removed from the user's modem.

FR 2 933 835 describes an approach for solving this problem in which an alternative pair of wires to those normally used for carrying telephony signals are used for carrying the VOIP signals. In order to do this, various dongles are installed which provide sockets into which the telephones to be connected are plugged—one of these dongles includes a port into which the modem is to be connected and connects to the conducters within the extension wiring which are connected at the termination unit to the incoming drop wires. The dongles connect the normally used wires (wires 1 and 3) from the telephone leads to an alternative pair of wires in the user's existing extension wiring (e.g. wires 4 and 5 although they expressly point out that any pair of unused wires could be used—e.g. any pair from the 2, 4, 5 and 6 wires)—thus in one example they give, wire 1 in the telephone lead is connected to wire 4 in the home extension wiring and wire 3 in the telephone lead is connected to wire 5 in the home extension wiring. In this way the VOIP signals are carried though the extension wiring over wires 4 and 5 and the DSL signals are carried through the extension wiring on (the normally used) wires 1 and 3 which are connected at the termination unit directly to the drop wire coming from the external access network. This approach, hereinafter referred to as a four wire solution, is a good solution where there is a spare pair of conductors reliably connected throughout a user's home extension wiring. However, in the four wire solution proposed in FR 2 933 835, the bell wire remains connected at the termination unit to the drop wires and so can still cause interference problems with the DSL signals carried onto the drop wires and over the data carrying conductors within the extension wiring. Furthermore, the approach would not work with telephony devices which require the presence of a bell signal on their incoming bell wire since the system makes no provision for such a bell signal to be generated.

Furthermore, in some situations there will not be such a spare pair of conductors reliably connected up through the extent of the user's home extension wiring (i.e. between the master socket and each extension socket). In many cases there may only be three wires reliably connected throughout the home extension wiring, namely the two normal data carrying wires and the third bell wire. In such a case, an alternative solution is required.

SUMMARY OF THE INVENTION

According to a first aspect of the present invention, there is provided a system for providing telephony and data services to a user, the system comprising: a termination unit to modem connector (which could include a user's existing home telephone extension wiring) containing at least three conductors able to carry electrical signals; a termination unit for terminating an incoming pair of conductors (e.g. a copper pair (i.e. a pair of copper wires)) from a telecommunications access network within the user's premises, the termination unit having a connector portion operable to connect with the termination unit to modem connector, the termination unit being arranged to provide a good electrical connection between two of the conductors within the termination unit to modem connector (which conductors, when in use, carry data signals between the access network and the user modem and are hereinafter referred to as the two data carrying conductors) and the incoming pair of conductors from the access network respectively and being operable to provide an insulation of the other conductor or conductors within the termination unit to modem connector from the incoming pair of conductors from the access network; a user modem which is connectable to the termination unit to modem connector and is operable to transmit data signals onto and to receive data signals from the data carrying conductors and is further operable to transmit telephony signals onto and to receive telephony signals from a pair of modem-side telephony signal carrying conductors which includes the other conductor or one of the other conductors within the termination unit to modem connector and one of the data carrying conductors within the termination unit to modem connector; and a cross-connection unit having a connection portion which is operable to connect with a telephone connector, which telephone connector includes at least two telephone-side telephony signal carrying conductors operable to carry telephony signals to and from a telephone apparatus, the cross connection unit further including a cross-connection which electrically connects the two telephone-side telephony signal carrying conductors to the two modem-side telephony signal carrying conductors respectively when in use.

In this way, provided each conventional telephone is connected via a cross-connection unit to the "termination unit to modem connector" (i.e. typically the user's domestic extension wiring arrangement and in particular an extension socket thereof) it is possible for the existing wiring in the premises to be used to carry telephony signals while still supplying power over the data carrying conductors (by placing a Direct Current (DC) voltage across the conductors—hereinafter referred to as a reverse power feed) which may be drawn by a network DSL modem located (for example at a distribution point) in the access network. In this way, a DSL modem including a reverse power feed may be connected into a user's existing extension socket and the user's other conventional telephones can continue to operate using VOIP even if they are connected into other extension sockets. The only requirements on the part of the user are to ensure that the new termination unit is formed at the master socket (e.g. by installing a suitable interstitial face plate as described below) and that the required cross connection units are used to interconnect the user's existing telephones for connection to the user's existing extension wiring. The telephony signals are carried between each telephone and the modem via a different pair of wires through the extension wiring to the pair of wires used to carry the data signals (e.g. the DSL signals) (albeit that the different pairs include one common wire in this so-called 3-wire solution). The cross connection unit thus acts as an In-Line Analog POTS Presentation Adapter (ILAPA).

In certain preferred arrangements, every device with an analog telephony terminal (e.g. analog telephone, analog fax machine, etc.) needs an ILAPA. Alternative installations might include parts of the home telephony network isolated from that part carrying DSL signal by a single ILAPA which converts the whole analog part of the home network. Though, an arrangement of this kind is likely to require an engineer visit to install rather than being simply achievable by a user him or herself.

The above described 3 wire solution results in the pair of data carrying conductors and the pair of telephony signal carrying conductors sharing a common conductor. This "3-5 wire solution" can thus be used in environments where the extension wiring within a customer's premises ensures that at least three conductors are reliably connected to the master socket from every extension socket (which is used for a piece of conventional telephony equipment—e.g. telephone, fax machine, etc.)—this is a common situation in the United Kingdom where the "third" wire is a "bell wire" which is used for carrying ringing signals to control ringing of a telephone's "bell". In an alternative "4-wire solution" there is no common conductor between the data carrying pair and the telephony signal carrying pair. This is appropriate for situations in which the extension wiring within a user's premises ensures that four conductors are reliably connected around the premises and to the master socket. This situation is also often common in the United Kingdom where two of the "wires" are typically "live"—i.e. carrying telephony and DSL signals between telephones/modem(s) and the access network—and one is the "bell wire" associated purely with telephony, and one (if present) is spare. This situation also often occurs in other countries simply because the telephone wiring used as extension wiring often contains two or more pairs of conductors and the conductors are reliably connected up to a corresponding connection point (e.g. a pad) within a socket to which the extension wiring is connected (even if these wires are not actually used!).

Since (especially in the UK) a fourth wire may often be present within the extension wiring but may also often not be reliably connected throughout the extension wiring and/or may not be reliably connected to corresponding connection points (e.g. pads) within the extension sockets wired up by the extension wiring, a second more sophisticated embodiment of the present invention provides a combination solution in which a four wire solution is used where possible, but otherwise the system is capable of dropping back (manually or automatically) to using a 3-wire solution. This may be provided in a fully manual embodiment with physical switches on the cross-connection unit(s) and a physical switch or software user configurable option within the user modem or it may be done automatically with no manual input required by a user—this is discussed in greater detail below.

In an alternative aspect of the present invention, instead of providing a cross-connection unit or units to which a telephone apparatus (or multiple telephone apparatuses) may attach before connecting directly to the extension wiring, the termination unit could include a cross connection which cross connects at least one of the incoming conductors to a third or fourth conductor of the extension wiring and the modem receives data signals from and transmits data signals onto this pair, while the normal pair of conductors used for carrying live signals over the extension wiring is used for receiving and transmitting telephony signals only. However, if the bell wire has to be used (because there are only three wires reliably connected around the extension wiring) this solution is only sensible for use with telephone devices which completely ignore the bell wire, since otherwise some kind of (specialized) dongle would still be required prior to each telephone in order to provide an appropriate bell wire connection (with a capacitor to the respective live telephony conductor). Additionally, attempting to carry DSL signals over a pair of conductors which are not arranged in a twisted pair might well not be feasible because of noise implications. Thus in general this alternative aspect/embodiment is generally less preferred to one in which a cross-connection unit is provided as a dongle into which each telephone apparatus is connected, except in four wire solutions, where there is no bell wire (e.g. in certain countries other than the UK).

According to a second aspect of the present invention, there is provided a user installable device for providing a termination unit for use in the system of one of the above described aspects of the invention, the device being installable into a conventional termination unit which provides a bell wire connection to produce a modified termination unit which, when a connector, which includes a bell wire conductor, is connected to the modified termination unit isolates the bell wire conductor of the connector from both of the incoming pair of conductors attached to the termination unit when in use.

According to a third aspect of the present invention, there is provided a user modem which includes a connector portion which is configured to connect to a user modem to terminator connector (e.g. a home user's existing extension wiring) having at least three conductors contained therein, and is operable to transmit data signals onto and to receive data signals from a first pair of conductors included in the connector and is further operable to transmit telephony signals onto and to receive telephony signals from a second pair of conductors included in the connector wherein the first and second pairs of conductors include exactly one common shared conductor. For example, if the connector includes four wires labelled wires 2, 3, 4 and 5 respectively, then the first pair of conductors might comprise wires 2 and 5 and the second pair of conductors might comprise wires 5 and 3 or wires 5 and 4 or wires 2 and 3 or wires 2 and 4 but could not comprise wires 2 and 5. Note that where the user modem to termination unit connector (e.g. the user's extension wiring) includes at least four functioning conductors the modem might additionally be capable of transmitting data signals on one pair of conductors and telephony signals on another pair of conductors chosen so that they do not include any common conductors (i.e. according to the 4 wire solution), but it should additionally be capable of supporting the 3 wire solution (i.e. where exactly one conductor is shared between the two pairs) such that if the connector (e.g. the user's extension wiring) can't support a 4 wire approach (e.g. because it doesn't have 4 functioning conductors) it can fall back to a 3 wire approach.

Preferably, when the modem is operating in accordance with a 3 wire solution, the modem is operable to reverse the polarity of a power supply voltage applied across the first pair of conductors at approximately the same time as the polarity of a voltage applied across the second pair of conductors is switched for telephony signalling purposes.

In an alternative aspect, there is provided a DSL modem incorporating a reverse power feed and an analog telephone adapter which is operable to reverse the polarity of reverse power feed in synchronisation with applying a reverse polarity at the output of the analog telephone adapter.

According to a fourth aspect of the present invention, there is provided a user installable cross-connection unit for use in the system of the first aspect of the present invention, the cross-connection unit having a female connection portion which is operable to connect with a male connection portion of a connector having at least three conductors, the female connection portion of the cross connection unit including a plurality of connection points each of which is configured to be brought into electrical connection with a corresponding connection point of the male connection portion of the connector when it is correctly connected to the female connection portion of the cross-connection unit; the cross-connection unit further including a male connection portion which is operable to connect with a female connection portion of a socket containing a female connection portion which is mechanically similar to the female connection portion of the cross connection unit, wherein the cross-connection unit includes a cross connection between at least one of the connection points of the female connection portion and one of the connection points of the male connection portion of the cross connection unit such that a connection point of the male connection portion of the connector is electrically connected to a different connection point of the female connection portion of the socket when the male connection portion of the connector is connected to the female connection portion of the cross connection unit and the male connection portion of the of the cross connection unit is connected to the female connection portion of the socket compared to the connection point of the female portion of the socket to which the connection point of the male connection portion of the connector would be connected if the connector were directly connected to the socket and wherein the cross-connection unit either fixedly includes or is configurable to include a direct connection between at least one of the connection points of the female connection portion and one of the connection points of the male connection portion of the cross connection unit such that a connection point of the male connection portion of the connector is electrically connected to the corresponding connection point of the female connection portion of the socket when the male connection portion of the connector is connected to the female connection portion of the cross connection unit and the male connection portion of the of the cross connection unit is connected to the female connection portion of the socket. Thus, for example, if the connector has a socket (e.g. an existing extension socket) which includes connection points 2, 3, 4 and 5 which are electrically connected to conductors 2, 3, 4 and 5 within the connector (e.g. within the user's existing extension wiring) respectively, the cross connection portion may be arranged such that when a conventional telephone jack is connected to the socket via the cross connection unit, conductor 2 in the jack is connected to connection point 3 of the socket instead of to connection point 2 within the socket while the conductor 5 in the jack might be directly connected through to connection point 5 in the socket. Additionally, the cross connection unit might be configurable such that it can be switched between a first configuration in which the conductor 5 in the jack is directly connected to connection point 5 in the socket and another configuration in which say the conductor 5 in the jack is cross connected to connection point 4 in the socket (for use in a 4 wire approach).

Preferably, the cross connection unit is additionally configured to connect one of the connection points of the female connection portion of the connection unit to one of the connection points of the male connection portion of the cross-connection unit via a capacitor. In this way, the functionality of the bell wire connection within a master socket may be simulated. Preferably, the two connection points within the female connection portion of the cross-connection unit which carry live telephony signals from a conventional telephone apparatus when connected to the cross-connection unit are connected to a low pass filter before connection to the connection points of the male connection portion of the cross-connection unit.

According to a fifth aspect of the present invention, there is provided an interstitial plate, for modifying a termination unit by disconnecting a "bell wire" connection point of the termination unit from an incoming network side pair of conductors (e.g. a drop wire) such that only two connection points on the modified termination unit are connected to the incoming conductors, in combination with one or more interface devices each of which is operable to provide a bell wire connection point to a telephony device by providing a filtered connection between two telephony signal carrying conductors within a user's home extension wiring and the bell wire connection point, whereby a bell wire signal can be provided to a telephony device without requiring a bell wire signal to be carried over the user's extension wiring. In other words the bell wire signal is disabled at the termination unit and then recreated at each interface device (e.g. a cross connection device or ILAPA) in case a telephony device connected to the interface device requires a bell signal to function correctly.

This avoids the need to include a low pass filter or choke in the termination unit for filtering signals coming from the bell wire of the user's extension wiring and instead simply disconnects the bell wire completely within the extension wiring and simply recreates the bell signal from the two main telephony signal carrying conductors within the extension wiring at the interface (e.g. the ILAPA).

Further aspects of the present invention relate to systems, devices and methods of operating a user modem to provide data and telephony services as set out in the claims and to processor implementable instructions for carrying out such methods and to a carrier medium, most preferably a tangible carrier medium such as a magnetic or optical disk or a solid state storage device, etc., carrying such processor implementable instructions.

BRIEF DESCRIPTION OF THE DRAWINGS

In order that the present invention may be better understood, embodiments thereof will now be described, with reference to the accompanying drawings in which.

DETAILED DESCRIPTION OF A FIRST EMBODIMENT OF THE INVENTION

Figure 1:
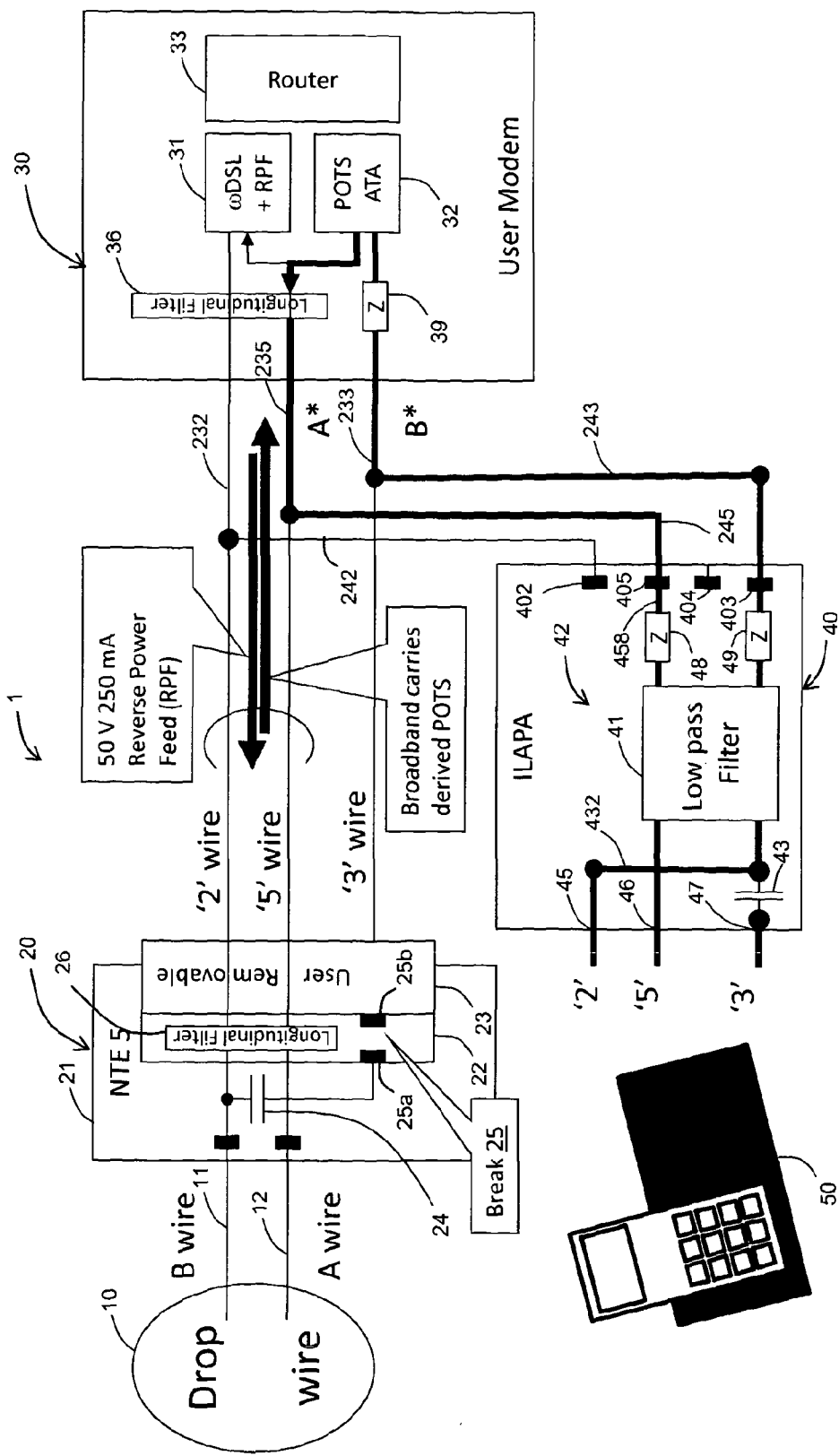
FIG. 1 is a schematic block diagram of a three wire solution system according to a first embodiment of the present invention.

Referring now to FIG. 1, a three wire solution system 1 for providing telephony and data services to a user's home premises in which a reverse power feed is supplied from the user's modem to a network modem, is shown. The system 1 includes in this example a drop wire 10 forming part of an access network provided by a telecommunications service provider such as British Telecommunications (BT) within the United Kingdom. The drop wire comprises a pair of wires known as the B wire 11 and the A wire 12.

The drop wire 10 is terminated within the user's premises by a network termination element such as the well known NTE 5 master socket device (in the UK). A conventional NTE 5 comprises a main body 21 and a user removable portion 23. In the present embodiment, an interstitial plate 22 has been inserted (conveniently this can be done by a user if the plate is configured to include an aperture as in GB2445212, the contents of which are incorporated herein by way of reference). In the present case, however, the electrical function of the interstitial plate is to isolate the 3 wire connection point of the NTE 5 from the incoming B wire of the drop wire 10. This is done by ensuring that there is a large resistance 25 between the original connection point 25a on the main portion of the NTE 5 and the corresponding connection point 25b on the interstitial plate. This can be done simply by not providing a conductive connection between these two points as indicated by the "break" 25 in FIG. 1. It should be noted that the break is on the user side of the capacitor 24. The capacitor 24 is the normal capacitor provided in an NTE 5 which enables the 3 wire within the user's exchange wiring to act as a bell wire which can cause on old telephone to ring when a ringing signal is sent but which will not generate undesirable "tinkles" when other signals are sent over the A and B wires of the drop wire 10. This break 25 in the user installed interstitial plate 22 isolates the 3 wire totally from the drop wire 10 throughout the user's premises including in any extension sockets etc. The interstitial plate 22 additionally provides a longitudinal filter 26. This matches a similar longitudinal filter 36 contained in the user modem 30. Together, the filters ensure that the conductors carrying the DSL signals are well balanced. The NTE 5 (and the ILAPA 40 discussed below) may additionally contain other components to improve the performance of the system and to provide protection against surges etc—for example surge protection resistors etc but these are not discussed further since they are not pertinent to the present invention.

As in the case in GB2445212, the interstitial plate 22 includes an NTE side which couples to the NTE 5 main body 21 in place of the user removable portion 23 and includes an interface which mechanically corresponds to the interface provided by the main portion 21 into which the user removable portion 23 may couple instead of into the main portion 21. The user removable portion 23 also provides an interface (or socket) into which a jack associated with a connector (having conductors or wires 232, 233 and 235) may be plugged. This interface together with the electrical connections from the interface to the drop wire 10 corresponds to the claimed connector portion of the termination unit and it is apparent that the connector portion is modified from the conventional connector portion of a conventional NTE 5 only in that the '3' wire connection part of the user removable portion 23 is no longer coupled to the B wire 11 of the drop wire 10 via a capacitor 21 because of the resistance or break 25.

The user removable portion 23 also provides a convenient connector portion to which extension wiring may be connected (again see GB2445212 for details). Since this is electrically connected to the user removable portion 23, the '3' wire of all such extension wiring is also isolated from the B wire 11 rather than being connected to it via a capacitor as in the conventional arrangement. In FIG. 1, the wires 242, 245 and 243 may be thought of as extension wiring connecting the master socket to an extension socket (not shown), the wires corresponding to the '2' wire, the '5' wire and the '3' wire of the extension wiring respectively.

The system 1 further includes a user modem 30. As shown, the user modem 30 includes a DSL transceiver and Reverse Power Feed (RPF) unit 31. The DSL transceiver unit is indicated as an ωDSL transceiver to indicate that it can be any type of high bandwidth DSL modem such as a VDSL modem, etc. Its precise functioning is not relevant to the present invention and so will not be described further herein except to state that it is capable of providing a Reverse Power Feed (RPF) to a remote network modem unit in a known manner. In the present case, the RPF provides a 50V DC voltage which is capable of supplying up to 250 mA (or up to 12.5 Watts of electrical power) to the remote modem.

The modem 30 also includes a router 33 and a POTS Analog Telephone Adapter (ATA) 32. The Router unit 33 may be conventional in operation and is not described further herein. Additionally, the POTS ATA unit 32 can be largely conventional in operation except that unlike with most conventional ATA units, ATA 32 is electrically connected to, in the present 3 wire embodiment, the '5' wire and '3' wire of the NTE 5 20 to modem 40 connector (conductors 235 and 233) and of the extension wiring (conductors 245 and 243 respectively). In conventional modems, the POTS ATA unit would have its own separate port into which telephones or extension wiring should be connected and there would be a dedicated connector between the modem 30 and the NTE 5 20 for carrying exclusively DSL signals (and possibly a reverse power feed in reverse power feed systems).

Since the modem 30 has its POTS ATA unit 32 connected to the 5 and 3 wires of the extension wiring, these become like the incoming A and B wires of the drop wire 10 when operating in a POTS analog manner. For this reason, these conductors are indicated in FIG. 1 as the A* and B* wires. As shown in FIG. 1, these are connected to an In-Line Analog POTS Presentation Adapter (ILAPA) 40.

In order to prevent voltages appearing on the in premises wiring that substantially exceed those that can occur at present with telephony, the power feed, and telephony battery voltage (as provided by the POTS ATA 32) are correlated. This means first that they must be of the same polarity (i.e. if line 235 is notionally held at DC ground, line 232 should be supplied with +50V as should line 233 in normal mode), and that if the telephony signalling creates a line reversal (reversing the battery voltage) then the power feed must be switched at the same time (so that if line 235 is notionally considered to remain at DC ground, then lines 232 and 233 are simultaneously supplied with −50 Volts DC). It can be assumed that there is a full wave rectifier in the remote modem because this is normal practice (since the correct placement of the A and B wires in the access network cannot be guaranteed) and so this reversal of polarity in the reverse power feed (by the RPF 31) does not interrupt power feed to the remote modem.

The ILAPA 40 performs a number of functions in order to enable an analog device 50 (e.g. telephone apparatus 50) to be connected to the system 1 via the ILAPA 40. One function it performs is to isolate the 2 wire (232, 242) from the analog device 50 by providing a break or resistance 42 and to connect the 2 wire connection point 45 in the ILAPA 40 to the B* wire (243, 233) via a low pass filter 41. Additionally, the A* wire is connected directly through to the corresponding 5 wire connection point 46 via the same low pass filter to filter out high frequency DSL signals from the A* B* pair (which might have leaked onto this pair from the 2 wire and 5 wire pair which is carrying DSL signals, as well as to prevent high frequency noise from the analog telephone 50 from leaking onto the DSL carrying pair (232, 235). Additionally, the ILAPA 40 contains a capacitor 43 which corresponds to the capacitor 24 found in the NTE 5 device which is used to generate a bell wire signal from the incoming B wire 11—note the capacitor 43 performs the same function of converting the signal on the B* wire into an appropriate signal for driving the bell wire connected to the '3' connection point 47 in the ILAPA 40 in order to enable the telephone 50 to operate correctly if it relies upon the bell wire for its ringing behaviour.

The ILAPA 40 and the modem 30 additionally contain a number of very-wide-band high-impedances 39, 48, 49. These act to isolate the extension wires from POTS circuits at DSL frequencies by a very-wide-band high impedance (Z) (39, 48, 49) inserted where necessary (within the ILAPA 40 in series with lines 245 and 243 on the modem side of the low pass filter and within the modem 30 on the ILAPA side of the POTS ATA unit 32 in series with line 243) to ensure good balance of the DSL path on wires '5' (235) and '2' (232), and to ensure good isolation from wire '3' (233). The impedances Z are designed to exhibit low impedance at POTS frequencies but high impedance at all DSL frequencies.

The ILAPA 40 has four connection points 402, 405, 404 and 403 which connect to the '2' '5' '4' and '3' wires in the extension wiring when present. In this embodiment the connection point 404 is redundant since the fourth wire is not being used and there is a connection 458 from the connection point 405 to the impedance Z 48. The cross connection 432 ensures that connection points 403 and 45 are cross connected (connection points 404 and 46 are connected by the straight connection including the impedance 48 connected in series therealong).

A 4 Wire Solution

Second Embodiment

Figure 2:
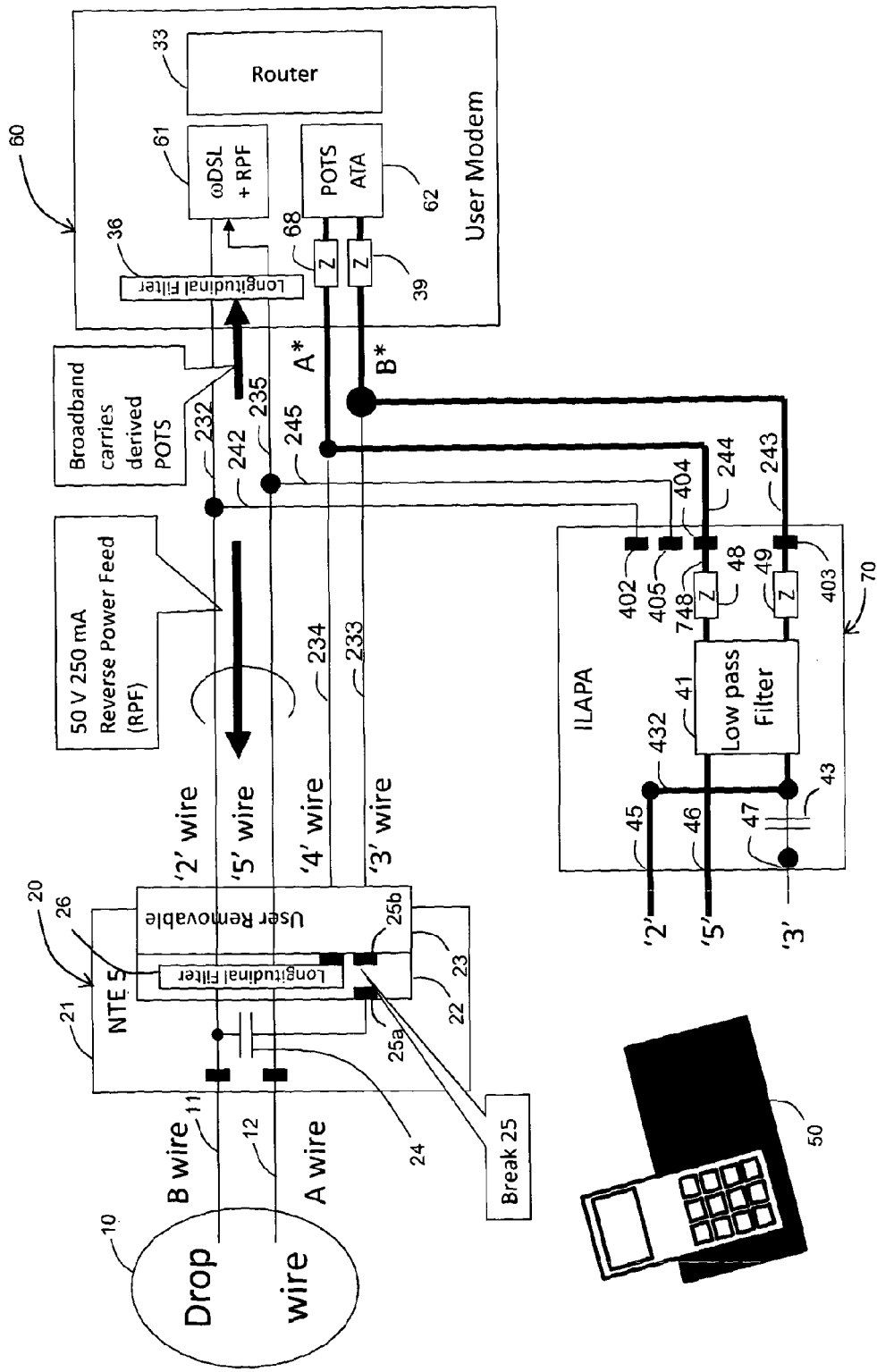
FIG. 2 is a schematic block diagram of a four wire solution system.

Referring now to FIG. 2, a four wire solution system 2 is illustrated. The system 2 is very similar to the system 1 and like reference numerals have been used to indicate like elements. The main difference is that the '5' wire 235 can be used exclusively to carry DSL signals (and the Reverse Power Feed) while the fourth wire ('4' wire 234 and 244) can be used together with the bell wire ('3' wire 233 and 243) exclusively for carrying POTS signals. In addition it means that the modified modem 60 may include a simpler DSL transceiver and RPF unit 61 which does not need to perform synchronized polarity reversals, and the POTS ATA 62 has a connection to the '4' wire instead of to the '5' wire via an additional impedance Z 68 which matches the impedance Z 48 in the ILAPA.

The ILAPA 70 of the four wire solution system is almost identical to that of the ILAPA 40 of the first embodiment except that in this case the connection point 404 is not redundant and is instead connected via connection 748 to the impedance Z 48 while the connection point 405 is not connected to anything.

This four wire solution is generally to be preferred where it is possible (e.g. because the user's premises has extension wiring which continuously carries four wires throughout the extension wiring). In summary, in the 4 wire solution the typically 4 wire nature of extension wiring is exploited. In this approach an analog telephony adapter present in the user modem (e.g. a home hub (the gateway that terminates the DSL transmission)) feeds telephony into wire '3' and wire '4' of the conventional extension wiring. Any telephony terminal (telephone, fax, etc.) is connected to the existing extension wiring via an in-line adapter (the ILAPA) that isolates extension wires '5' and '2' from the telephone, feeding the telephone wires '5' and '2' from extension wires '3' and '4' instead. Also the telephone bell wire '3' is fed from telephone wire '2' via a capacitor as is currently implemented in the network termination box (NTE 5) that is the demarcation point between the access provider's network and the customers network.

As a note on the wiring numbering, the use of terms such as '2' wire, '5' wire etc. stems from the use of registered jacks such as RJ11 which typically provide 6 connection points for up to three pairs of wires running within a connector fitted with an RJ at at least one end thereof. It is common in telephony wiring for connectors to be used which carry 4 wires and these are typically wired up to the RJ such that connection points 3 and 4 are connected to one pair of wires and connection points 2 and 5 are connected to another pair of wires. Usually just one of these pairs of wires is used to carry signals although in the UK it is common for wires 2 and 5 to carry the telephone signals coming from the incoming A and B wires while the 3 wire is used as the bell wire.

Note that this four wire solution is distinguished form the four wire solution of FR 2 933 835 in that the bell wire of the extension wiring is completely disconnected from the incoming drop wire such that there is no possibility of interference getting from the bell wire in the extension wiring to the DSL carrying conductors either at the exchange side of the termination unit or between the termination unit and the modem.

Third Embodiment

A third embodiment is basically a combination of the first embodiment and the four wire solution of the second embodiment in which the ILAPA contains a switch which can switch the ILAPA from an ILAPA 70 of the four wire solution to an ILAPA 40 of the first embodiment. Additionally, the modem is configurable to operate either as a modem 60 according to the four wire solution or as a modem 30 according to the three wire solution (i.e. first embodiment). A manual switch is provided on the ILAPA to enable a user to switch it from one mode to another. Initially the switch is in the position to create an ILAPA 70 according to the four wire solution and the modem is configured to operate also as a modem according to the four wire solution. However, if the user cannot get the telephones to work in this configuration, it is assumed that the fourth wire is not correctly connected throughout the premises and the user switches the ILAPA to operate in accordance with the first embodiment and reconfigures the modem (via a web browser interface to the modem in the normal manner) to operate in accordance with the first embodiment (to create a three wire solution arrangement).

This fall-back to a three wire solution from a four wire solution could be automated either partially or completely. A partial automation would consist of the modem automatically switching to try a three wire approach if the four wire approach appears to be unsuccessful. A fully automated approach would involve the modem signalling somehow to each of the ILAPA's to reconfigure themselves. This might be done by having a a circuit contained within the ILAPA which responds to a signal received between the bell wire connection point and one of the two normal telephony signal carrying conductor connection points by triggering a magnetic switch to move from a first position where the ILAPA is in a four wire solution configuration to a second position where the switch is in a three wire configuration position, and having the modem configured to generate the appropriate signal (which might for example be a simple ac signal at a particular predetermined frequency which causes a resonance in the ILAPA. Alternative possibilities will occur to persons skilled in the art.

The invention claimed is:

1. A system for providing telephony and data services to a user's premises, the system comprising:
a termination unit for terminating an incoming pair of conductors from a telecommunications access network within the user's premises, the termination unit having a connector portion operable to connect with a corresponding termination unit to modem connector containing at least three conductors able to carry electrical signals, the termination unit being arranged to provide a good electrical connection between two of the conductors within the termination unit to modem connector, which conductors, when in use, carry data signals between the access network and the user modem and are hereinafter referred to as the two data carrying conductors, and the incoming pair of conductors from the access network respectively, wherein the termination unit is operable to provide an insulation of the other conductor or conductors within the connector from the incoming pair of conductors from the access network;
a user modem which is connectable to the termination unit to modem connector and is operable to transmit data signals onto and to receive data signals from the data carrying conductors and is further operable to transmit telephony signals onto and to receive telephony signals from a pair of modem-side telephony signal carrying conductors which includes the other conductor or at least one of the other conductors within the termination unit to modem connector; and
a cross-connection unit having a connection portion which is operable to connect with a telephone connector, which telephone connector includes at least two telephone-side telephony signal carrying conductors operable to carry telephony signals to and from a telephone apparatus, the cross connection unit further including a cross-connection which electrically connects the two telephone-side telephony signal carrying conductors to the two modem-side telephony signal carrying conductors respectively when in use.

2. The system of claim 1 wherein the pair of data carrying conductors and the pair of telephony signal carrying conductors share a common conductor.

3. The system of claim 1 wherein there is no common conductor between the data carrying pair and the telephony signal carrying pair.

4. A user installable device for providing a termination unit for use in the system of claim 1, the device being installable into a conventional termination unit which provides a bell wire connection to produce a modified termination unit which, when a connector, which includes a bell wire conductor, is connected to the modified termination unit isolates the bell wire conductor of the connector from both of the incoming pair of conductors attached to the termination unit when in use.

5. A user modem which includes a connector portion which is configured to connect to a connector having at least three conductors contained therein, and is operable to transmit data signals onto and to receive data signals from a first pair of data carrying conductors included in the connector and is further operable to transmit telephony signals onto and to receive telephony signals from a second pair of modem-side telephony signal carrying conductors included in the connector and wherein the first and second pairs of conductors include one common shared conductor.

6. A user installable cross-connection unit having a female connection portion which is operable to connect with a male connection portion of a connector having at least two conductors, the female connection portion of the cross connection unit including a plurality of connection points each of which is configured to be brought into electrical connection with a corresponding connection point of the male connection portion of the connector when it is correctly connected to the female connection portion of the cross-connection unit; the cross-connection unit further including a male connection portion which is operable to connect with a female connection portion of a socket containing a female connection portion which is mechanically similar to the female connection portion of the cross connection unit, wherein the cross-connection unit includes a cross connection between one of the connection points of the female connection portion of the cross-connection unit and one of the connection points of the male connection portion of the cross-connection unit such that a connection point of the male connection portion of the connector is electrically connected to a different connection point of the female connection portion of the socket when the male connection portion of the connector is connected to the female connection portion of the cross connection unit and the male connection portion of the cross-connection unit is connected to the female connection portion of the socket compared to the connection point of the female connection portion of the socket to which the connection point of the male connection portion of the connector would be connected if the connector were directly connected to the socket; and wherein the cross-connection unit further includes a direct connection between one of the connection points of the female connection portion of the cross-connection unit and one of the connection points of the male connection portion of the cross-connection unit such that a connection point of the male connection portion of the connector is electrically connected to the same connection point of the female connection portion of the socket when the male connection portion of the connector is connected to the female connection portion of the cross-connection unit and the male connection portion of the cross-connection unit is connected to the female connection portion of the socket as the connection point of the female portion of the socket to which the connection point of the male connection portion of the connector would be connected if the connector were directly connected to the socket.

7. The system of claim 6, wherein the cross-connection unit is configurable such that the cross-connection unit can be switched between a first configuration in which there is a direct connection as set out in claim 6 and another configuration in which the formerly directly connected connection point of the female connection portion of the cross-connection unit is cross connected to a different connection point in the male connection portion of the configurable cross-connection unit and therefore also to a different connection point of the female portion of the socket for use in a four wire approach.

* * * * *